June 14, 1955     H. E. RUNION     2,710,574
ELIMINATING INK MIST OR OTHER DETRITUS FROM ROOMS
Filed Feb. 8, 1951     4 Sheets-Sheet 1

INVENTOR
HARLESTON EARLE RUNION

BY Scrivener & Parker
ATTORNEYS

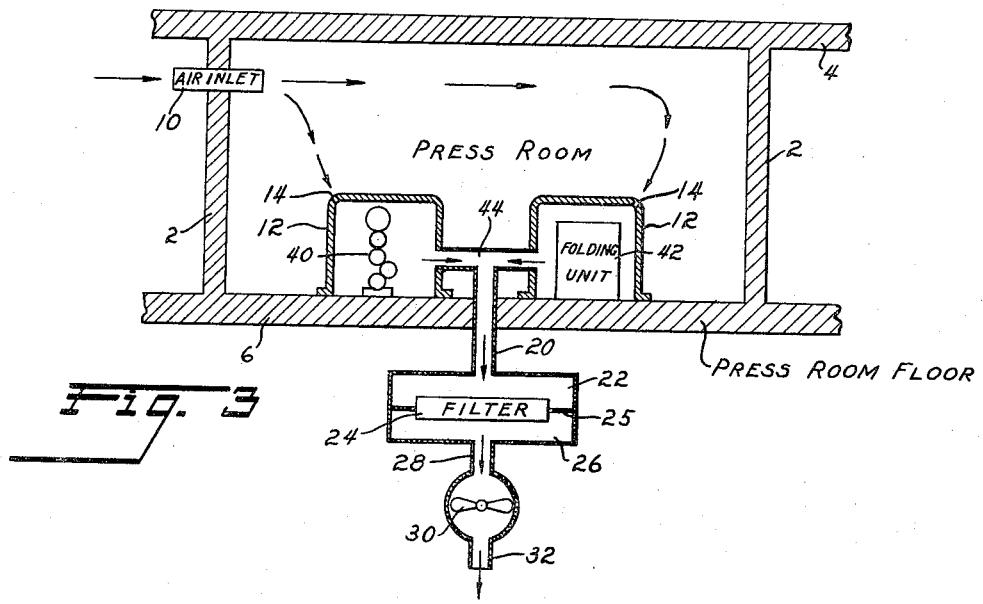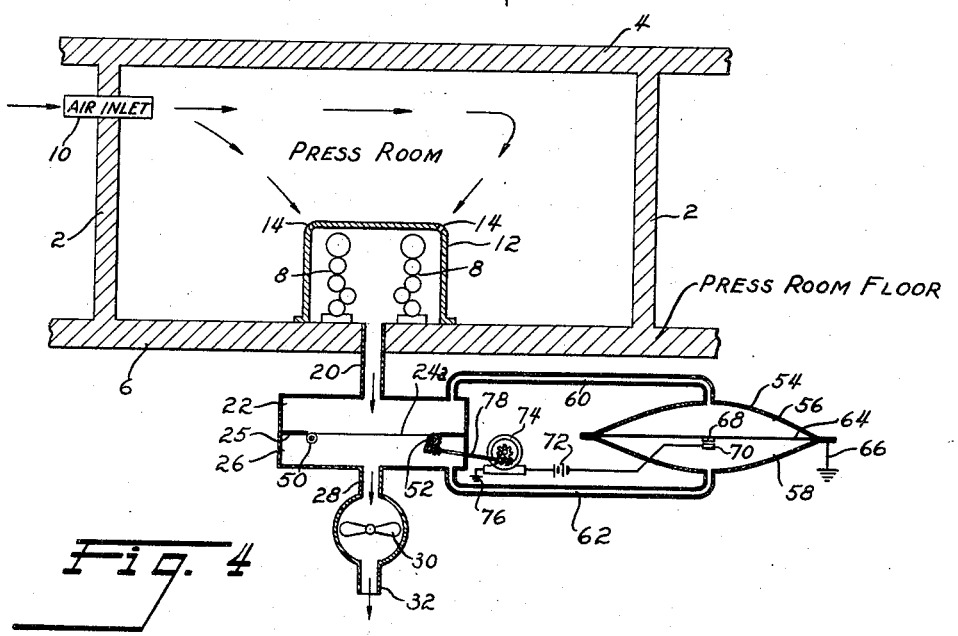

June 14, 1955     H. E. RUNION     2,710,574
ELIMINATING INK MIST OR OTHER DETRITUS FROM ROOMS
Filed Feb. 8, 1951     4 Sheets-Sheet 3
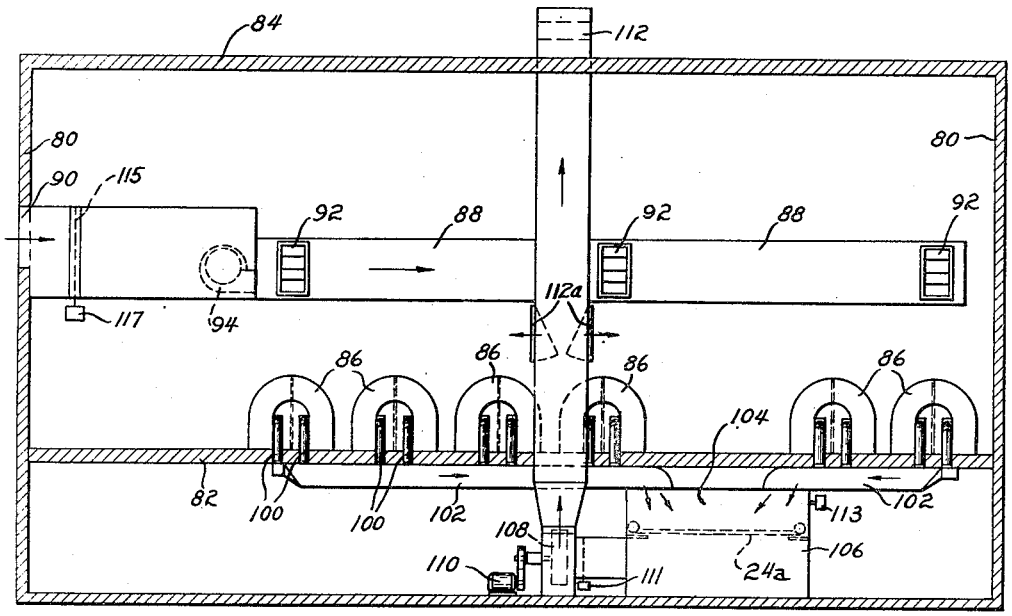
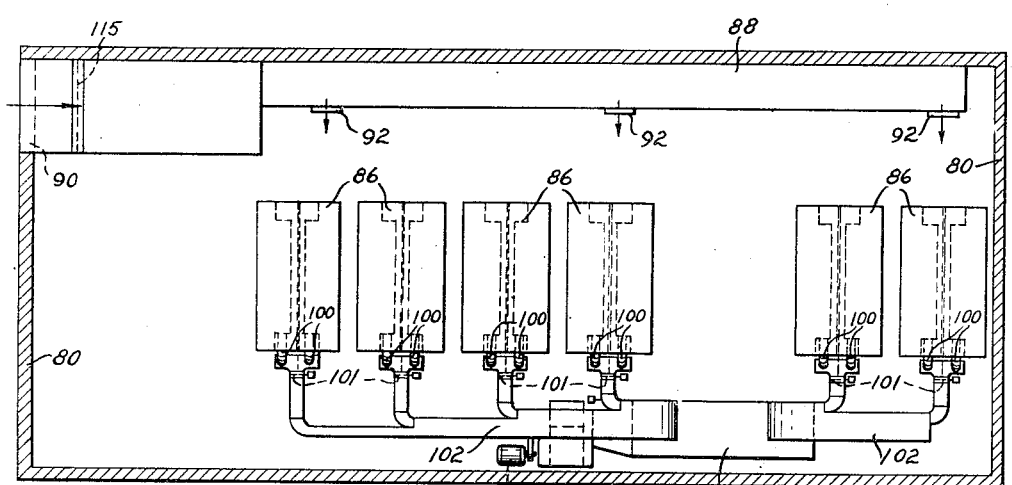
INVENTOR
HARLESTON EARLE RUNION
BY Scrivener & Parker
ATTORNEYS

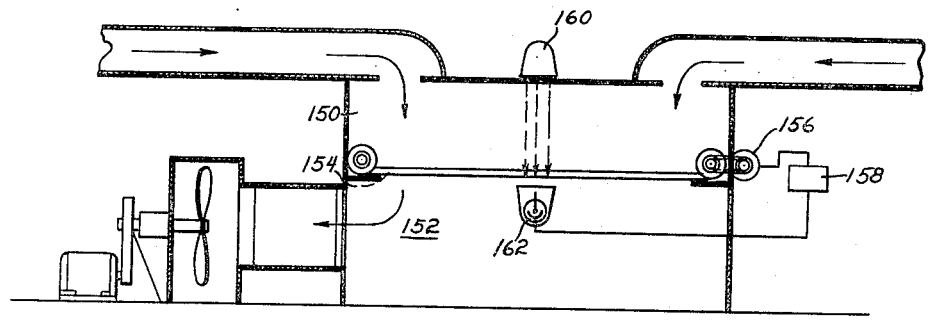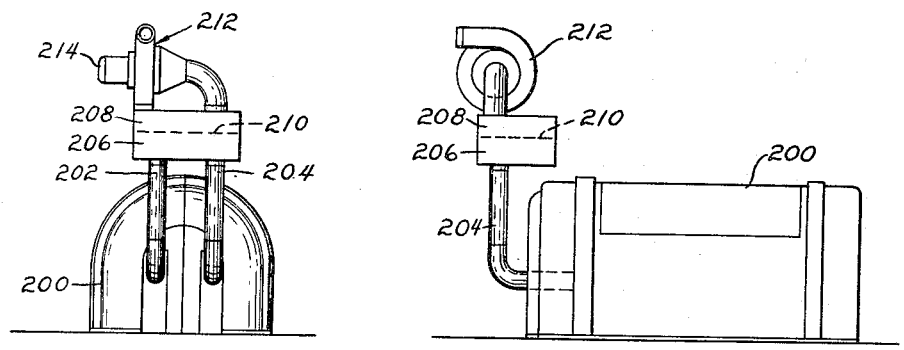

United States Patent Office 2,710,574
Patented June 14, 1955

2,710,574

ELIMINATING INK MIST OR OTHER DETRITUS FROM ROOMS

Harleston E. Runion, Louisville, Ky.

Application February 8, 1951, Serial No. 209,999

1 Claim. (Cl. 98—115)

This invention relates broadly to the control of conditions within the pressroom of a printing plant such as a newspaper publishing plant and, more particularly, has to do with the elimination from such pressrooms of the ink mist that normally pervades the atmosphere thereof. However, while the invention is particularly intended for the elimination of ink mist it will be useful for the elimination of any undesirable dust or mist which may be produced within a pressroom or other enclosure by any machine or operation which can be effectively enclosed.

In the operation of modern, high-speed roller presses the co-action of the rapidly rotating abutting inking and other rollers produces a fine mist of ink which escapes from the press unit and pervades the pressroom, where it settles on the presses, walls, ceilings and all objects within the room and, in addition, causes discomfort to workers. The usual method of combating the ink mist is to ventilate the pressroom by both blowing air into it and exhausting air from it at points remote from the presses. It will be apparent that the result of this procedure will be to insure that the ink mist passes through the room. Thus, while a part of the mist is finally removed from the pressroom by this system, it still pervades the atmosphere of the room and much of the mist settles within the room and remains there. Other suggestions for the elimination of ink mist have been made as will be seen by reference to the United States Letters Patent to Wood, No. 1,873,234, Diefenbach, No. 2,096,164 and Roesen, No. 2,274,167. None of the systems or apparatus disclosed and claimed in these patents has proved useful or successful and at the present time ink mist is treated, although only partially and badly, by the ventilating system described hereinbefore.

By this invention I have intended to, and have, provided a new means, method and system for eliminating ink mist from the atmosphere of a pressroom, which is so operative that the ink mist never enters the pressroom or passes therethrough, but is eliminated by removal from its source. As a part of this invention I have also provided a means and method for insuring that the ink mist cannot enter the pressroom, and other means for completing the elimination of the mist after its removal. Other objects, results and features of my invention will be made apparent by the following description and annexed drawing, but it will be apparent to those skilled in the art that the embodiment which is described and illustrated is only illustrative of the invention and imposes no limitation thereon not imposed by the appended claims.

In the drawings forming part of this application:

Fig. 3 is a drawing similar to Figs. 1 and 2, but showing the application of the invention to a press unit and a paper folding and cutting unit;

Fig. 4 is a view showing a system such as that of Fig. 1 and also including means for renewing the filter;

Fig. 5 is a side elevational view of a pressroom having a battery of double press units therein and showing means for carrying out the invention;

Fig. 6 is a top plan view of the pressroom illustrated in Fig. 5;

Fig. 7 is a view showing parts of a system according to my invention and, more particularly, showing a means, alternative to that shown in Fig. 4, for automatically replacing used filter medium with new;

Fig. 8 is a front view of a double press unit having a separate unit associated therewith for removing ink mist, and Fig. 9 is a side view of the press unit and ink mist removing system illustrated in Fig. 8.

My invention is applicable to a pressroom or other room in which there are one or more machines or devices which in their operation produce ink mist, paper dust or similar atmospheric matter which it is desirable to remove. In this application the invention is particularly described with reference to the removal of ink mist produced by roller presses but it is of general utility for the described purpose.

Figure 1:
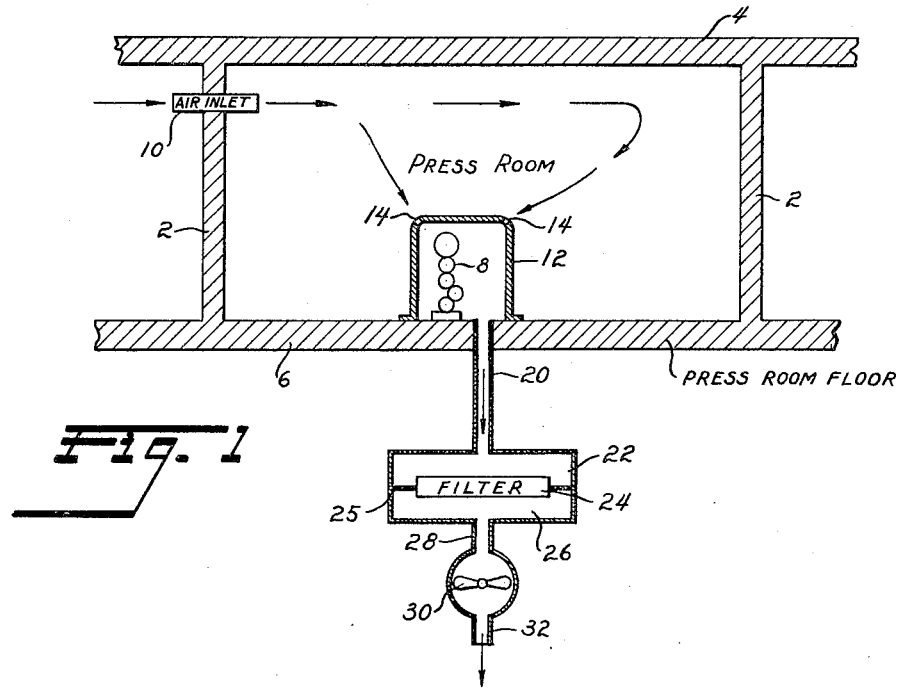
Fig. 1 is a diagrammatic view showing a pressroom, a press unit therein, and means according to this invention for eliminating ink mist from the pressroom.

In Fig. 1 of the drawings there is illustrated in diagrammatic form a pressroom having walls 2, ceiling 4 and floor 6 and which may have the usual doors or windows, which are preferably kept shut for best operation of the invention. Within this room there is positioned a printing press 8 of the type which, in operation, creates a mist of ink which, as is well known, permeates the atmosphere of the pressroom with undesirable results and effects.

Means are provided by my invention for eliminating this undesirable ink mist and this desirable result is accomplished by enclosing the space in which the ink mist is generated and maintaining this space at a slight negative pressure with respect to the pressroom, whereby any passage of air between the pressroom and the enclosed space will be from the pressroom into the space and passage of air and ink mist from the enclosed space to the pressroom will be prevented. In carrying out the invention in practise fresh outside air is introduced into the pressroom through an air inlet means 10. Each press unit, or that part thereof which generates ink mist, is enclosed by metal or other enclosing walls and covers in such a way that the enclosure substantially prevents ink mist generated within the enclosure from passing out of the enclosure into the pressroom but, at the same time, permits fresh air to pass from the pressroom into the enclosure. In other words, the enclosing means is not airtight and does not seal the enclosed space from the pressroom. The enclosing means is disclosed at 12 in Fig. 1 and has openings 14 therein which represent the non-airtight nature of the enclosing means. Means are provided by the invention for withdrawing air and ink mist from the interior of the enclosing means, and to effect this the interior of the enclosed press unit, or the part of such unit which generates ink mist is connected by passage 20 to a plenum chamber 22 which communicates through filter means 24 with a second plenum chamber 26 but which is otherwise separated therefrom by a wall 25. The second chamber 26, in turn, communicates through passage 28 with the intake side of a blower or fan 30, the exhaust side of which delivers to a discharge passage 32 which may lead to any desirable place.

In the operation of the described system, the fan 30 operates to draw air from the interior of the pressroom through the openings 14 into the enclosure in which the press unit or that part thereof which generates ink mist is located, thence into the first plenum chamber 22, through the filter 24, into the second plenum chamber 26, through the blower casing and into the discharge passage 32 from which it is discharged to the atmosphere or other delivery area. The solids of the ink mist will be deposited on the filter and the air between the filter and the point of ultimate discharge will be substantially free of ink. It will be seen that in my system of ink mist removal the flow of air is such, i. e. from the pressroom to the enclosure to the point of discharge, that the ink mist cannot enter the pressroom, which is therefore filled entirely with air introduced through the inlet means 10. My invention provides means for insuring and promoting this flow of air and ink mist, and in accordance with this aspect and feature of the invention the amount of air introduced into the room through inlet means 10 and the amount of air exhausted by blower 30 are so adjusted that the air pressure within the pressroom external to the enclosed press unit, or part thereof, is greater than that within the enclosed unit.

Figure 2:
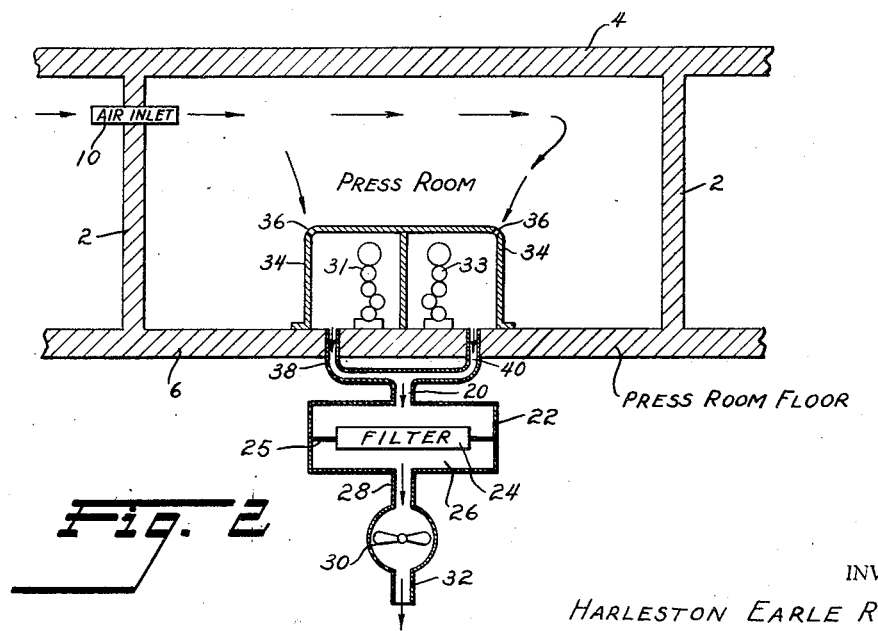
Fig. 2 is a drawing similar to Fig. 1 but showing the application of the invention to a double press unit.

Many press units are so-called double units and, in these there are two sources of ink mist. The application of my invention to such a double unit is disclosed in Fig. 2, wherein there are two press units 31, 33 each of which is enclosed by means 34 having air admitting apertures 36 therein. Air and ink mist are withdrawn from the two enclosures through separate passages or pipes 38, 40 both of which communicate with the first plenum chamber 22. In all respects other than the two press units and the plural passages necessary to exhaust air and ink mist therefrom, this embodiment of the invention is similar in construction and operation to that of Fig. 1.

As stated hereinbefore, the invention is generally useful to improve the atmosphere of any room in which there is located an apparatus producing any substance which passes into and fouls the atmosphere. As an example, there is located in almost all pressrooms a paper folding machine which, by reason of the fact that it cuts as well as folds, produces paper dust which permeates the pressroom. The passage of this dust into the pressroom may be prevented by my invention and in Fig. 3 there is disclosed a pressroom having therein a press unit 40 and a paper folding and cutting machine 42. In accordance with my invention each of these machines, or the parts thereof producing the ink mist or paper dust, is enclosed in the non-airtight manner described hereinbefore and each enclosed part is connected by suitable passages 44 to the first plenum chamber 22. In all other respects the construction and operation of the embodiment disclosed in Fig. 3 are the same as in other embodiments and no further description thereof is believed to be necessary.

It will be seen that as solids accumulate on the filter during operation of my invented system the pressure differential between the two plenum chambers 22, 26 will increase because of the increasing resistance of the filter to the passage of air. In accordance with an important feature of my invention this pressure differential is utilized to operate a mechanism for changing or renewing the filter means, whereby a new filter is introduced and the pressure differential reduced. Means according to the invention for effecting this are disclosed in Fig. 4, wherein is illustrated a pressroom and mist removal system similar in all respects to that disclosed in Fig. 1 or the other figures. The filter 24ª which separates the two plenum chambers 22, 26 and through which air must pass in flowing from chamber 22 to chamber 26 is shown in this figure as being mounted on rollers 50, 52 which are disposed at opposite sides of the aperture between the two chambers. The filter medium 24ª is normally stationary but may be rolled off of one roller 50 onto the second roller 52, upon operation of the roller 52, to place a new length of filter medium over the aperture. Means are provided by the invention for operating the roller 52, to renew the filter medium, in response to increase of the pressure differential between the two plenum chambers, and such means comprise, first, a sealed hollow body 54 having upper and lower interior chambers 56, 58 which communicate respectively with the upper and lower plenum chambers 22, 26 through pipes 60, 62. A flexible diaphragm 64 separates the chambers 56, 58 and is grounded at 66. On its lower surface the diaphragm 64 carries an electrical contact member 68 which is adjacent, above and normally out of contact with a second contact 70 which is connected through electrical source 72 to one terminal of electric motor 74, the other terminal of which is grounded at 76. The armature of the motor is connected to roller 52 through gearing or other suitable means 78 in order to operate the same.

The operation of the system of Fig. 4 will be apparent. So long as the filter 24ª is not clogged by solids deposited thereon air will pass from plenum chamber 22 to chamber 26 sufficiently freely to maintain the pressure differential between the plenum chambers sufficiently low to prevent downward movement of diaphragm 64. When, however, the filter is sufficiently blocked by deposit of solids thereon the pressure differential between the plenum chambers will rise and when a predetermined differential is reached the diaphragm will move downwardly to close contacts 68, 70 and complete the circuit through the motor 74, causing the same to operate the roller 52 to move the used filter surface from roll 50 onto roll 52. As the aperture between the plenum chambers is progressively covered by the new, unused filter the passage of air between the plenum chambers becomes more free and the pressure differential between the two chambers decreases, thus causing diaphragm 64 to move upwardly and de-energize the motor to stop movement of the filter. It will be apparent to those skilled in the art that other means than those disclosed in Fig. 4 may be provided within the scope of the invention for controlling the movement of the filter medium to replace used filter medium with new. One such means is disclosed in Fig. 7 in which there is illustrated a filter unit comprising the upper plenum chamber 150, lower plenum chamber 152, filter medium 154, filter medium drive motor 156, and motor control relay 158. A light source 160 is positioned above the filter medium 154 and a photoelectric cell 162 is positioned below it in the path of light from the source and is connected to energize the relay 158. In the operation of this system, light from source 160 will normally pass through the filter medium 154 and will cause the photocell 162 to operate to maintain the relay 158 in condition to maintain the motor 156 inoperative. This condition will prevail until the filter medium 154 becomes so clogged that it will not pass light, whereupon the de-energization of the photocell will cause the relay to operate to energize the motor, causing the filter medium to be replaced in the manner described in connection with Fig. 4. As the new medium moves into position between the two plenum chambers it will permit light from the source 160 to pass to the photocell, thus causing the relay 158 to operate to stop the motor 156.

In Figs. 5 and 6 of the drawings there is illustrated the actual application of the invention to a newspaper pressroom for the purpose of removing ink mist. In these figures the pressroom is shown as having walls 80, floor 82 and ceiling 84. Within the pressroom there is a battery of double press units 86 each of which units includes two devices generating ink mist. Air in introduced into the pressroom through duct 88 which opens to the exterior at 90 and discharges into the pressroom through a plurality of openings 92. A blower 94 is provided in the duct to force air therethrough and into the pressroom. Any desired heating, air-conditioning and pressure-controlling means may be provided for treating the incoming air. Each single press unit, or that part thereof which generates ink mist, is enclosed in accordance with the invention and each enclosed space is connected by pipe 100 to a manifold 102 which opens into a first plenum chamber 104 which in turn communicates with a second plenum chamber 106 through a filter 24ᵃ through which air can pass, which will remove solids such as ink, and which is preferably automatically operative in the manner described hereinbefore. A fan 108, driven by motor 110, has its intake connected to the second plenum chamber 106 and exhausts through duct 112 which may open to atmosphere above the building housing the pressroom although, if desired, the filtered air exhausted by the blower 108 may be returned to the pressroom through adjustable selectively operable damper 112a. The operation of the devices illustrated in Figs. 5 and 6 and described hereinbefore will be understood from the description of operation heretofore given in connection with Figs. 1 to 4. In the application of the invention to any multi-unit press installation air is drawn only through the units which are operating, it being recognized that in usual pressroom practise one or more units of a multi-unit press may be shut down temporarily. Automatic or other means may be provided for insuring that air is drawn only through those units which are operating. The means for effecting this may be a motor-controlled damper 101 in the pipe leading from each press unit 86 to the exhaust manifold 102, as shown in Fig. 6. The operation of this damper may, if desired, be controlled by the lubricating oil pressure of the press unit with which the damper is associated. Regardless of the number of press units operating, a constant pressure is maintained in the upper plenum chamber 104 and in the exhaust manifold 102. This is accomplished by means of a volume control damper 111 which is located at the inlet to fan 108 and which is controlled by the pressure within the upper plenum chamber for which purpose a static pressure regulator 113 may be associated with the upper plenum chamber. The amount of air supplied to the pressroom through air inlet means 90 is controlled by a damper 115 which, in turn, is controlled by a static pressure regulator 117 within the pressroom.

While the invention may be applied to a multi-unit press installation in the manner disclosed in Figs. 5 and 6, in which all of the units are connected to a common plenum chamber, it is contemplated by the invention that means may be associated with each separate press unit for drawing air and ink mist therefrom. A press unit having such individual means associated therewith is disclosed in Figs. 8 and 9 in which is illustrated a double press unit 200 the two units of which are connected by pipes 202, 204 to the lower plenum chamber 206 of a filter unit which is separated from the upper plenum chamber 208 by filter means 210. A fan 212 operated by motor 214 is connected to the upper plenum chamber and draws air and ink mist from the two press units through pipes 202, 204, lower plenum chamber 206, filter 210, upper plenum chamber 208 and fan 212, which exhausts it to atmosphere. It is contemplated that the fan may, if desired, exhaust the filtered air directly into the pressroom. The filter 210 is preferably constructed and operable in the same manner as described hereinbefore.

In the claim appended hereto I have used the word "detritus" to mean any comminuted material such, for example, as ink mist and paper dust.

While I have described and illustrated certain embodiments of my invention it will be apparent to those skilled in the art that other embodiments, as well as modifications of those disclosed, may be made without departing in any way from the spirit or scope of the invention, for the limits of which reference must be had to the appended claim.

What is claimed is:

A ventilating and ink mist eliminating system for press rooms comprising a substantially air tight press room containing presses, air-duct means communicating the interior of said room with the outside atmosphere, a blower in said duct for forcing outside air into said room, an enclosure for each set of ink mist producing rolls of each of said presses, each of said enclosures being substantially airtight but having restricted openings therethrough communicating the interior of said enclosures with the atmosphere of said press room, a chamber, a second duct communicating the interior of said enclosures with said chamber, a filter element extending across said chamber, a third duct communicating said chamber with the outside atmosphere, a suction blower in said third duct for creating a lower pressure in said chamber and in said enclosures than the pressure in said press room to produce a draught through said press room and through said enclosures to ventilate said press room by exhausting the air therein through said enclosures, said air carrying therewith ink mist in said enclosures into said chamber, thence through said filter and into said third duct and thence to the outside atmosphere, and adjustable damper means in said third duct selectively operable to communicate the interior of said duct with said press room for returning a portion of the filtered air in said duct to said press room depending upon the degree of opening of said damper.

References Cited in the file of this patent

UNITED STATES PATENTS

| | | |
|---|---|---|
| 1,873,234 | Wood | Aug. 23, 1932 |
| 1,982,639 | Christofferson | Dec. 4, 1934 |
| 2,115,725 | Koch | May 3, 1938 |
| 2,218,453 | Mickle | Oct. 15, 1940 |
| 2,227,481 | Bates | Jan. 7, 1941 |
| 2,335,173 | Corey | Nov. 23, 1943 |
| 2,339,987 | Evans | Jan. 25, 1944 |
| 2,368,363 | Kennedy | Jan. 30, 1945 |
| 2,415,471 | Dorfan | Feb. 11, 1947 |
| 2,484,685 | Burdick et al. | Oct. 11, 1949 |
| 2,579,401 | Schneible et al. | Dec. 18, 1951 |

FOREIGN PATENTS

| | | |
|---|---|---|
| 21,859 | Great Britain | 1896 |
| 115,305 | Austria | Dec. 10, 1929 |